No. 731,041. PATENTED JUNE 16, 1903.
E. GATES.
DIAMAGNETIC SEPARATOR.
APPLICATION FILED MAR. 19, 1900. RENEWED JAN. 13, 1903.
NO MODEL.

Witnesses:
D. W. Edelin.
A. E. Grant.

Inventor:
Elmer Gates,
by Rennie & Goldsborough,
Attys.

No. 731,041. Patented June 16, 1903.

UNITED STATES PATENT OFFICE.

ELMER GATES, OF CHEVY CHASE, MARYLAND, ASSIGNOR TO THEODORE J. MAYER, OF WASHINGTON, DISTRICT OF COLUMBIA.

DIAMAGNETIC SEPARATOR.

SPECIFICATION forming part of Letters Patent No. 731,041, dated June 16, 1903.

Application filed March 19, 1900. Renewed January 13, 1903. Serial No. 138,823. (No model.)

*To all whom it may concern:*

Be it known that I, ELMER GATES, a citizen of the United States, residing at Chevy Chase, in the county of Montgomery and State of Maryland, have invented certain new and useful Improvements in Diamagnetic Separators; and I do hereby declare the following to be a full, clear, and exact description of the invention, such as will enable others skilled in the art to which it appertains to make and use the same.

In a companion application for Letters Patent of the United States filed by me of even date herewith I have described and claimed a method of separating diamagnetic particles from a mixture containing them, said method consisting in feeding the mixture into a relatively intense part of a magnetic field, causing said field to be occupied by a body of retarding fluid, and thus retaining the material in and subjecting it to the action of the magnetic field until the diamagnetic particles to be separated have moved out from the mixture into a relatively weak part of the field and then collecting said particles separately as heads. The retarding fluid, if a stationary body, is a liquid, such as water, but is preferably caused to have an upward flow in opposition to the descent of the material, as will more fully appear by reference to my application referred to.

The present invention relates to apparatus for carrying out the method referred to.

Figure 1:
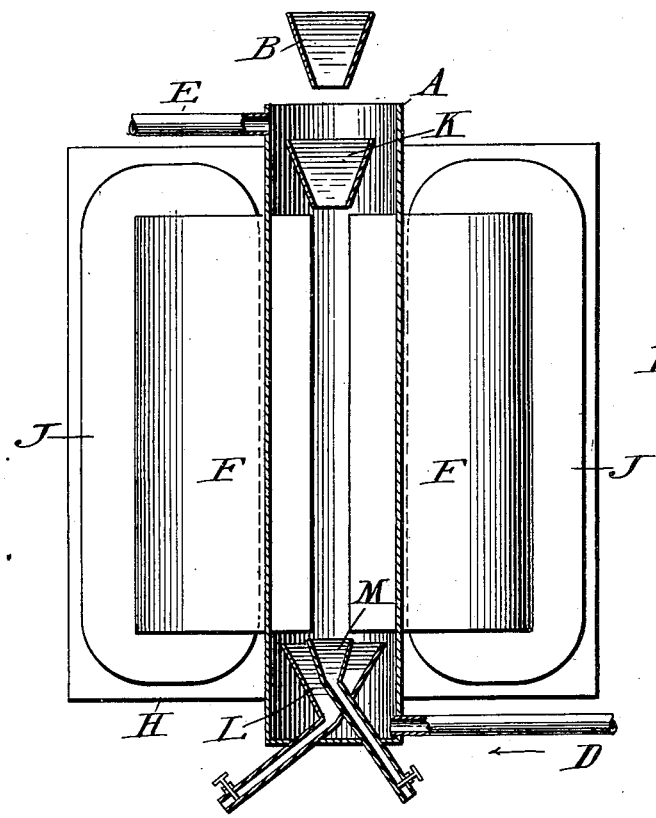
Figure 2:
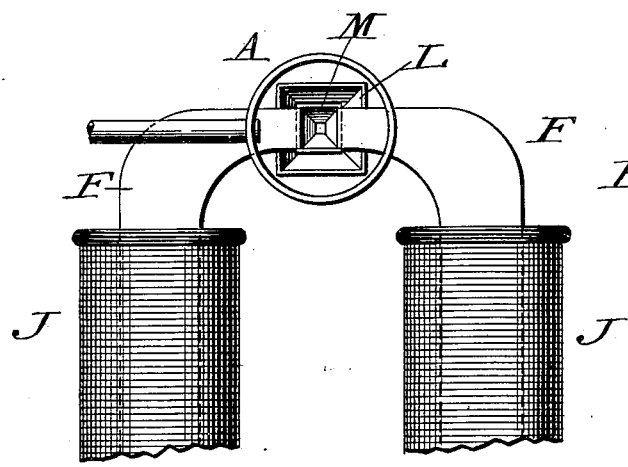

In the accompanying drawings, Figure 1 represents a front elevation, partly in section, of an apparatus embodying my invention. Fig. 2 represents a partial top plan view thereof with the upper hoppers removed.

Similar letters of reference indicate similar parts in both views.

Referring to the drawings, H indicates the yoke, F the cores, and J the energizing-bobbins, of an electromagnet whose pole-pieces are reduced or pointed, as shown, so as to obtain a highly-concentrated field of force. At the lower end of the interpolar space I locate a hopper M within a surrounding hopper L, the two hoppers having separate exit-chutes, as shown. At the upper end of the interpolar space I provide a hopper K, from which the material to be separated is dropped into the interpolar space. For the purpose of establishing in the interpolar space a body of liquid, such as water, I may conveniently inclose the pole ends of the cores within a water-tight casing A, which also incloses the hoppers K, L, and M. Into this receptacle A, I introduce a body of water, so that when the material to be separated is dropped from the hopper B into the hopper K it will be detained during its descent through the interpolar space by the presence of the water therein and will be subjected to a correspondingly-longer period of influence by the magnetic field of force.

Instead of having a stationary quiescent body of liquid within the receptacle A, I prefer to supply the water to the receptacle continuously through the inlet-pipe D, the overflow being taken off by the overflow-pipe E. The upward current thus established within the receptacle A opposes still more the descent of the material to be separated and enables it to be subjected for a correspondingly-longer period of time to the influence of the magnetic field. In some instances I may with good effect substitute for the upwardly-moving column of liquid an upwardly-moving body of some other fluid—as, for instance, air under such pressure as to cause a strong upward flow thereof through the receptacle A. As the material falls from the hopper K through the magnetic field of force the particles of greater diamagnetic susceptibility, such as gold or the like, move outwardly laterally from the falling column into the less-intense field on either side and are collected separately from the main body of diamagnetic material of less susceptibility, as sand or the like, which falls without substantial deviation through the interpolar space. The extent of deflection or deviation of the separated particles of greater diamagnetic susceptibility is increased correspondingly by the medium through which they fall. As explained in my method application hereinbefore referred to, I may in practice maintain an upward flow of water of sufficient pressure to practically arrest and detain the material in the magnetic field as against its tendency to settle in the hoppers until the fullest opportunity has been afforded for the gold particles to move outwardly into the weaker portion of the field, as contemplated. In such event the material to be treated would preferably be admitted in successive charges, each charge sufficing to occupy the interpolar space and remaining in the field under the detaining influence of the upwardly-established water-current until its accompanying gold had separated out, whereupon the flow may be momentarily stopped or diminished, thereby permitting the separated sand and gold to settle into their respective hoppers, or in view of the greater specific gravity of the gold the gold may be permitted to settle into its receiving-hopper by so graduating the upward flow that it will sustain the sand, while permitting the gold particles to fall through with sufficient slowness to move well outward during their descent into the range of the hopper L. In the latter case after the descent of all the gold particles the upward current may be increased to carry the sand upwardly with the overflow and out of the casing A.

Having thus described my invention, what I claim as new, and desire to secure by Letters Patent, is—

1. A diamagnetic separator, comprising an electromagnet, having pole-pieces separated by a long narrow inclosed interpolar space, means for dropping into said space the material to be separated, means for directing upwardly through said space a confined counter-current of a retarding fluid, and a receptacle for the separated diamagnetic material located beyond the vertical planes of the interpolar space; substantially as described.

2. A diamagnetic separator, comprising an electromagnet having a magnetic field, means for dropping into said field the material to be separated, a chamber or conduit inclosing the pole-pieces, said chamber having an overflow at its upper end, and an inlet-pipe at the bottom for supplying an upward current of confined fluid thereto, and a receptacle for the separated diamagnetic material located beyond the vertical planes of the interpolar space; substantially as described.

3. A diamagnetic separator, comprising vertically-arranged magnet poles-pieces, means for feeding the material to be separated and allowing it to gravitate through the space between said pole-pieces, means for forcing a counter-current of obstructing fluid upward through said space to retard the falling material, and a receptacle for the separated diamagnetic material located beyond the vertical planes of the interpolar space; substantially as described.

In testimony whereof I affix my signature in presence of two witnesses.

ELMER GATES.

Witnesses:
JOHN C. PENNIE,
A. E. GRANT.